United States Patent [19]

Watkins

[11] 4,125,213
[45] Nov. 14, 1978

[54] COLLAPSIBLE LUGGAGE FOR MOTORCYCLE

[76] Inventor: Julian W. Watkins, 222 Hendricks, Michigan City, Ind. 46360

[21] Appl. No.: 875,585

[22] Filed: Feb. 6, 1978

[51] Int. Cl.² ................................................ B62J 9/00
[52] U.S. Cl. .................................... 224/31; 224/32 A
[58] Field of Search ...................... 224/32 A, 31, 32 R, 224/30 R, 33 R, 33 A, 39, 40, 42.46 R, 42.45 R, 42.46 B, 29 R, 29 B; 190/43; 150/1, 1.5, 1.7, 2.6, 49, 28 R, 44

[56] References Cited

U.S. PATENT DOCUMENTS

| | | | |
|---|---|---|---|
| 3,813,018 | 5/1974 | Heltzen | 224/32 R X |
| 4,066,196 | 1/1978 | Jackson et al. | 224/36 X |

FOREIGN PATENT DOCUMENTS

| | | | |
|---|---|---|---|
| 77,333 | 3/1954 | Fed. Rep. of Germany | 224/32 R |
| 85,055 | 12/1935 | Sweden | 224/33 R |
| 231,632 | 7/1944 | Switzerland | 224/32 A |

Primary Examiner—Duane A. Reger
Assistant Examiner—Jerold M. Forsberg
Attorney, Agent, or Firm—Walter Leuca

[57] ABSTRACT

A collapsible luggage for a motorcycle comprising three rigid panels hinged together forming the base or bottom, forward upright and top. The bottom panel is rectangular in planular outline, the forward upright panel is trapezoidal in planular outline and the top panel is rectangular in planular outline, each thereof being dimensionally reduced from the preceding panel to which it is hingedly connected. The balance of the sides comprise a flexible material, the rearward side of which is formed with a zippered opening, the bottom edge of which is releasably buttoned to the rear edge of the bottom panel. The bottom side of the base panel is provided with fixed forward clamping members and a rearward pivotable clamp for releasable connection to the cross bars of a conventional luggage rack of a motorcycle. A belt means is provided adjacent the top of the front upright panel for carrying the luggage when dismounted from the luggage rack and for encircling the back rest of the motorcycle seat when attached to the luggage rack. One of the novel functions of the progressively diminishing dimensions of rigid panels, besides providing a streamlined appearance, is that the folding pattern for the flexible sides remains constant with a minimum of manual guiding when it is desired to collapse the luggage panels. Also, the collapsed luggage may serve as a briefcase in that entrance for flat material such as papers and files may be gained for insertion thereof by unbuttoning the flexible material connected to the rear edge of the bottom panel.

4 Claims, 8 Drawing Figures

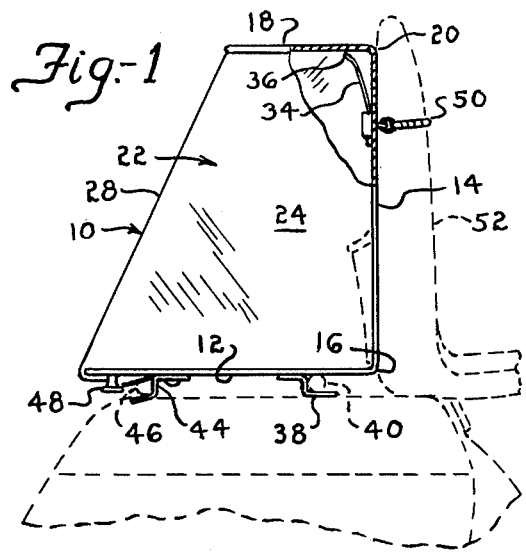
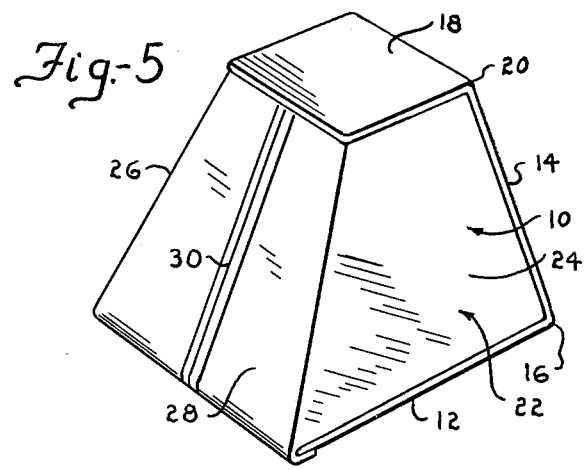
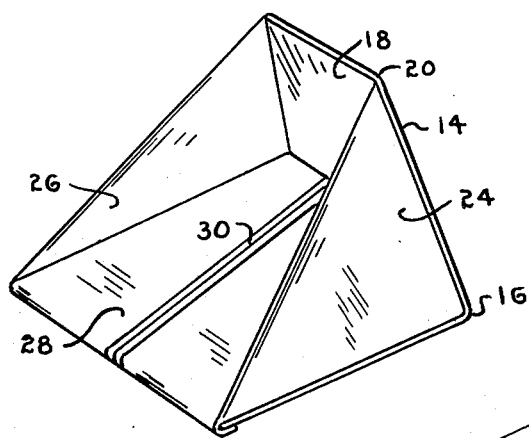
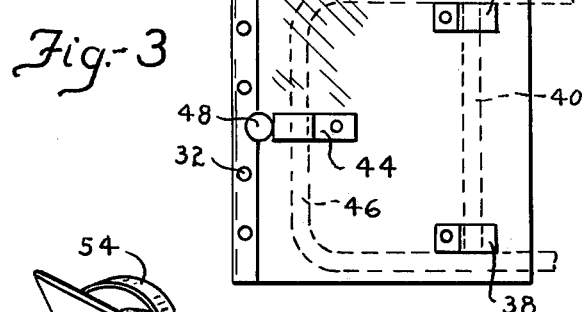
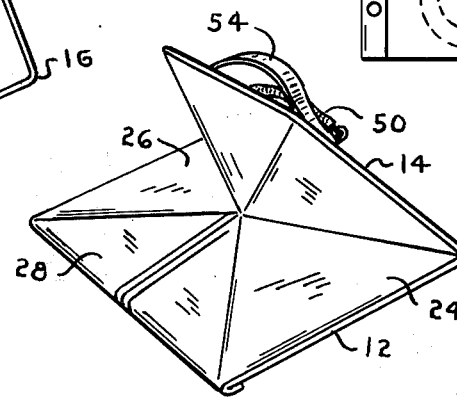
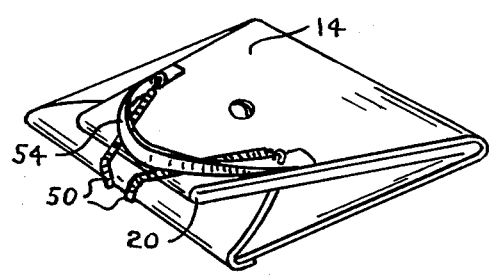
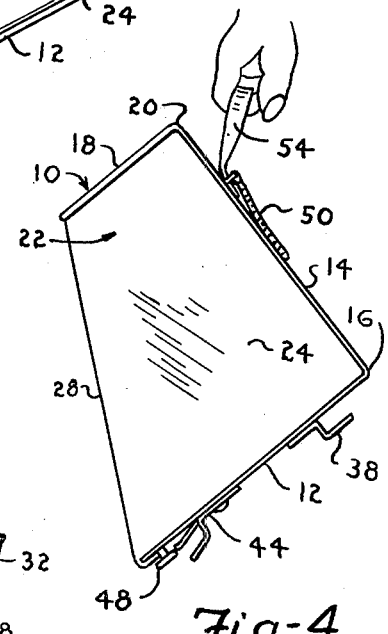
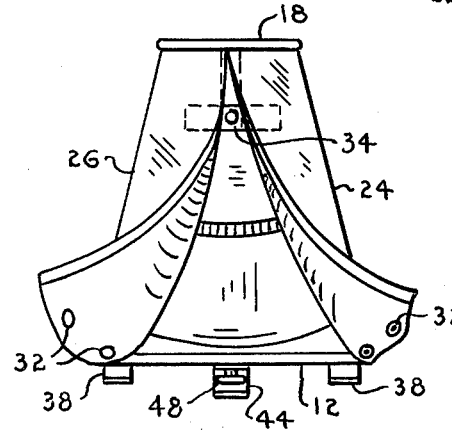

COLLAPSIBLE LUGGAGE FOR MOTORCYCLE

BACKGROUND OF THE INVENTION

1. Field of the Invention

This invention relates generally to luggage and more particularly a collapsible luggage as an accessory to a motorcycle.

2. Description of the Prior Art

The problems that this invention is directed to are that of providing luggage which is adapted to easily latch and unlatch from the luggage rack of a motorcycle, provide a streamlined appearance, is easily collapsible without manual guidance and be converted to a briefcase, and is easy to carry when expanded to form a luggage. In the prior art that I am aware of, all of these features are not provided in a single luggage structure.

SUMMARY OF THE INVENTION

Accordingly, I provide a luggage especially adaptable for latching to the luggage rack of a motorcycle which is formed in part by rigid panels of different sizes hinged together. The different size panels are arranged to make the outline of the luggage of this invention streamline, and also to allow the panels to fold so that the smaller panel overlaps against the next larger panel. This characteristic facilitates the uniform folding of the flexible material of the luggage to a compact unit. In addition, a strap member is provided to secure the top portion of the luggage when expanded, by connection to the back rest of the motorcycle seat commonly referred to as a "sissy" bar, and when the luggage is unlatched to render it portable, this strap serves also as a carrying handle.

Other objects and advantages of my invention will become more apparent after a careful study of the following detailed description taken together with the accompanying drawings which illustrate a preferred embodiment of my invention.

BRIEF DESCRIPTION OF THE DRAWINGS

FIG. 1 is a side elevation of the luggage of this invention, with a portion thereof broken away to show an interior brace, the luggage is shown connected to the motorcycle;

FIG. 2 is a back end view of this invention showing the opening flaps spread open;

FIG. 3 is a bottom view thereof;

FIG. 4 is a side view of the luggage of this invention removed from the motorcycle luggage rack and being carried by a strap which may also serve to secure the top end thereof to the back rest of the motorcycle;

FIG. 5 is a perspective view thereof as viewed from the top left quadrant of FIG. 1;

FIG. 6 is a perspective view similar to FIG. 5 showing the luggage with the top panel folded against the upright panel and the flexible material thereof folded inwardly to form triangular sides;

FIG. 7 is another perspective view similar to FIG. 5 showing the progression of the folding operation whereby the flexible triangular sides are further folded inwardly to divide each triangular side into two triangular sides; and FIG. 8 is still another similar perspective view whereby the upright and top panels are closed upon the base panel.

DESCRIPTION OF THE PREFERRED EMBODIMENT

Referring now to the drawings wherein is illustrated a preferred embodiment of my invention, reference numeral 10 designates generally the collapsible luggage of this invention. It comprises a rectangular base or bottom panel 12, a trapezoidal upright or forward panel 14 hinged at the bottom edge thereof as at 16 to the base panel 12, and a smaller rectangular top panel 18 hinged to the top side of the trapezodial panel 14 as at 20. A flexible sheet 22, formed of cloth, leather or any of the forms of vinyl or like material, is connected to the side edges of panel members 12, 14 and 18 to enclose the space delineated by the side edges of said panels to provide laterally opposing sides 24, 26 and a slanted back 28 which opposes the upright panel 14. Back 28 is longitudinally divided and provided with zipper means 30 to open and close the luggage of this invention. To facilitate the opening of luggage 10 and to gain entrance therein when the luggage is collapsed and thereby may be converted to a briefcase, I connect the bottom edge of back side 28 to the back edge of base panel 12 by means of snap buttons 32 so that the luggage is provided with a flap opening at its widest dimension. Pivotedly connected to upright panel 14 is bracket 34 as more clearly shown in FIGS. 1 and 2. Bracket 34 is curved so that the distal end 36 is spaced from upright panel 14 and serves to brace top panel 18 in a horizontal position when the luggage is expanded. Bracket 34 is pivotable out of the way as illustrated in FIG. 2, when it is desired to close top panel 18 against upright panel 14 to collapse the luggage of this invention. The bottom side of base panel 12 is provided with fixed forward clamps 38 for engaging a forward cross bar 40 of luggage rack 42 (shown in dotted lines) of the motorcycle (not shown) and a horizontally pivotable rearward clamp 44 for removably engaging a rear cross bar 46 of the luggage rack. Further provided immediately rearward of pivotable clamp 44 is a knob-like projection 48 situated adjacent the rear edge of panel 12. Clamp 44 is bifurcated to provide arm members for snugly embracing cross bar 46 and also to bear against knob 48 with a slight bias, the purpose being to retain pivot clamp 44 stationary rather than having it loose and movable when the luggage is disengaged from the luggage rack as illustrated in FIG. 4. In addition, holes may be provided in the distal ends of arm members of clamp 44 so that lock means may be inserted therethrough to prevent unauthorized removal of the luggage from the luggage rack. Knob-like projection 48 further serves to anchor resilient cord 50 which is anchored to the forward side of upright panel 14 adjacent the top thereof, which may be used together with handle strap 54 to embrace the top part of back rest 52 when the luggage is on the luggage rack of the motorcycle in its expanded condition. It also functions to bind the folded panels when the luggage is in collapsed condition as illustrated in FIG. 8, by flexing the midportion of cord 50 over hinged edge 20 of panels 14 and 18 and around the back edge of base panel 12 and anchored over knob 48.

In the operation of the luggage of my invention, it is securely mounted on a conventional luggage rack 42 of a motorcycle by pivoting clamp 44 to extend sideways and fitting fixed clamps 38 under cross bar 40. Clamp 44 is then pivoted so that the bifurcated portion the arm members securely embrace cross bar 46 of luggage rack 42. Resilient cord 50 is encircled over back rest 52 and if it is desired, handle strap 54 may also be fitted over the top of back rest 52 for additional stability and securement. When the luggage is not in use and it is desired to collapse the luggage to make the luggage into a compact brief-like case for storage or even to serve the purpose of a briefcase for papers and the like, luggage 10 either on the luggage rack or removed therefrom is collapsed by pivoting bracket 34 so that the distal end 36 thereof is removed from its bracing position against top panel 18 and top panel 18 is folded against trapezoidal panel 14. Since the width of top panel 18 is less than the width of base panel 12, flexible cover sheet 22 will always fold inwardly forming triangular sides out of trapezoidal shaped sides 24 and 26, and back 28 will provide a cover surface over the top of panel 12, all of said sides being thus folded will be taut and repeatedly assume the same folding pattern. Upright panel 14 may then be folded downwardly against panel 12 and with a minimum of manual guidance, triangularly folded sides 24 and 26 may be guided inwardly so that sides 24 and 26 are again triangularly folded as shown in FIG. 7 and ultimately folded in its flat position as shown in FIG. 8. To retain the flat position, resilient cord 50 may be pulled at the mid-portion to stretch around the rear edge of panel 12 and looped around knob projection 48. If it is desired to use the collapsed luggage as a briefcase, luggage 10 may be opened along rear edge of panel 12 by disengaging snap buttons 32 and entrance to the interior thereof may be thus gained and used for sheet material such as papers and file folders.

It is obvious from the above detailed descriptions when taken with the drawings, that luggage 10 of this invention provides a portable and collapsible luggage which meets the restrictive conditions of motorcycle carriage and also which makes it particularly suitable as a motorcycle accessory in that it is streamline in shape as well as pleasing to the eye, it is easily latchable and unlatchable to the motorcycle luggage rack. A strap handle is not only available for carrying the luggage when the luggage is removed from the motorcycle luggage rack but may also serve as additional means to secure the top portion of the luggage to the back rest when the luggage is mounted on the luggage rack. The novel structure of the luggage of this invention permits rapid, easy and uniformly neat folding of the luggage to a compact size when the luggage is empty or if it is desired to convert the luggage to a temporary briefcase, thereby providing a very useful and novel accessory for a motorcycle.

I claim:

1. A collapsible luggage for a motorcycle provided with a luggage rack and back rest, comprising:
    a rectangular shaped substantially rigid base panel;
    a trapezoidal shaped substantially rigid upright panel hingedly connected to said base panel;
    a rectangular shaped substantially rigid top panel hingedly connected to the top edge of said upright panel, the width dimension of the top panel being less than the width dimension of said base panel and the length dimension of said top panel being less than the height dimension of said upright panel;
    a flexible sheet material connecting said panels forming the other three walls of said luggage;
    an opening in said flexible sheet forming one of the walls of said luggage;
    clamp means on the bottom side of said base panel for releasably engaging said luggage rack; and
    strap means anchored to said upright panel for releasable connection to said motorcycle seat back rest serving to brace said luggage against said back rest when said luggage is mounted on said luggage rack, and serving as a handle for carrying said luggage when said luggage is removed from said rack.

2. The luggage of claim 1 wherein said trapzoidal panel is further characterized as being hingedly connected to said base panel at the bottom edge of said trapezoidal panel.

3. The luggage of claim 2 wherein said openings in said flexible sheet connecting said base panel at said side thereof is further characterized as including an opening extending longitudinally between said top panel and said base panel, and another opening extending laterally across said base panel.

4. The luggage of claim 3 wherein said strap means is further characterized as comprising two straps, one being non-resilient to serve as said handle and the other being resilient to serve as said brace.

* * * * *